(12) United States Patent
Yeo et al.

(10) Patent No.: US 12,459,074 B2
(45) Date of Patent: Nov. 4, 2025

(54) METHOD AND APPARATUS FOR FINISHING A SURFACE OF A COMPONENT

(71) Applicant: ROLLS-ROYCE plc, London (GB)

(72) Inventors: Swee Hock Yeo, Singapore (SG); Arun Prasanth Nagalingam, Singapore (SG)

(73) Assignee: ROLLS-ROYCE PLC, London (GB)

( * ) Notice: Subject to any disclaimer, the term of this patent is extended or adjusted under 35 U.S.C. 154(b) by 691 days.

(21) Appl. No.: 17/602,639

(22) PCT Filed: Mar. 12, 2020

(86) PCT No.: PCT/EP2020/056638
§ 371 (c)(1),
(2) Date: Oct. 8, 2021

(87) PCT Pub. No.: WO2020/207695
PCT Pub. Date: Oct. 15, 2020

(65) Prior Publication Data
US 2022/0161387 A1 May 26, 2022

(30) Foreign Application Priority Data
Apr. 12, 2019 (GB) ........................... 1905215

(51) Int. Cl.
*B24B 31/116* (2006.01)
*B24B 19/14* (2006.01)

(52) U.S. Cl.
CPC ............ *B24B 31/116* (2013.01); *B24B 19/14* (2013.01)

(58) Field of Classification Search
None
See application file for complete search history.

(56) References Cited

U.S. PATENT DOCUMENTS

| 998,762 A | * | 7/1911 | Faller | ...................... B28C 5/026 |
| | | | | 261/DIG. 26 |
| 4,707,952 A | * | 11/1987 | Krasnoff | .................. B24C 5/04 |
| | | | | 451/75 |

(Continued)

FOREIGN PATENT DOCUMENTS

| CN | 104440584 A | 3/2015 |
| CN | 105773318 A | 7/2016 |

(Continued)

OTHER PUBLICATIONS

Oct. 15, 2019 Examination and Search Report issued in British Patent Application No. GB1905215.8.
Jul. 2, 2020 Search Report issued in International Patent Application No. PCT/EP2020/056638.
Feb. 20, 2023 Office Action and Search Report issued in Chinese Patent Application No. 202080042837.6.

(Continued)

*Primary Examiner* — Brian D Keller
*Assistant Examiner* — Jason Khalil Hawkins
(74) *Attorney, Agent, or Firm* — Oliff PLC

(57) ABSTRACT

A method and apparatus for finishing a surface of a component. The method includes installing the component in an apparatus configured to deliver a flow of abrasives to the surface and to generate cavitation bubbles in a liquid contacting the surface using a cavitation generator that includes an ultrasonic generator configured to generate cavitation bubbles in the liquid contacting the surface by ultrasonic excitation in the liquid or a laser configured to generate cavitation bubbles in the liquid contacting the surface by laser excitation in the liquid; controlling the cavitation generator such that cavitation bubbles are generated to finish the surface by implosion of the cavitation bubbles; and controlling the flow of slurry to the surface so as to finish the surface by abrasion. An apparatus for finishing a surface of a component is also disclosed.

21 Claims, 11 Drawing Sheets

(56) References Cited

U.S. PATENT DOCUMENTS

| | | | | |
|---|---|---|---|---|
| 5,018,317 A | * | 5/1991 | Kiyoshige | B24C 1/045 |
| | | | | 451/75 |
| 5,154,347 A | * | 10/1992 | Vijay | B24C 1/00 |
| | | | | 239/4 |
| 5,626,508 A | * | 5/1997 | Rankin | B24C 5/04 |
| | | | | 451/75 |
| 2002/0000477 A1 | * | 1/2002 | Hara | B24C 7/0076 |
| | | | | 239/398 |
| 2011/0124270 A1 | * | 5/2011 | Liwszyc | B24C 7/0007 |
| | | | | 451/40 |
| 2013/0104615 A1 | | 5/2013 | Butler et al. | |
| 2013/0267152 A1 | * | 10/2013 | Tera | B24C 7/0076 |
| | | | | 451/99 |
| 2019/0061103 A1 | * | 2/2019 | Sanders | B05B 7/1463 |
| 2020/0189068 A1 | * | 6/2020 | Sanders | B01F 25/30 |

FOREIGN PATENT DOCUMENTS

| | | |
|---|---|---|
| CN | 108504831 A | 9/2018 |
| CN | 108581816 A | 9/2018 |
| CN | 108890541 A | 11/2018 |
| CN | 106392863 B | 3/2019 |
| CN | 109420986 A | 3/2019 |
| DE | 10 2005 061401 A1 | 6/2007 |
| EP | 3 450 103 A1 | 3/2019 |
| EP | 3 450 104 A1 | 3/2019 |

OTHER PUBLICATIONS

May 25, 2023 Office Action Issued in European Patent Application No. 20 711 145.1.

\* cited by examiner

METHOD AND APPARATUS FOR FINISHING A SURFACE OF A COMPONENT

CROSS-REFERENCE TO RELATED APPLICATIONS

This specification is based upon and claims the benefit of priority from United Kingdom patent application number GB 1905215.8 filed on Apr. 12, 2019, the entire contents of which is incorporated herein by reference.

BACKGROUND

Field of the Disclosure

The present disclosure relates to a method for finishing a surface of a component and an apparatus for finishing a surface of a component.

Description of the Related Art

Additive layer manufacturing (ALM) has been proposed for the manufacture of components having complex geometries, including complex internal structures or channels. However, ALM can produce a component with a surface that is rough and/or has suboptimal hydrophobic surface characteristics and requires finishing to ensure good fluid flow characteristics.

In particular, internal channels can be finished by abrasive flow machining (AFM), but this method is slow, and can result in accumulation of abrasive particles at bends and narrow passages, or contamination of the component with abrasive particles.

There is a need to develop a surface finishing method to alleviate at least some of the aforementioned problems.

SUMMARY OF THE DISCLOSURE

According to a first aspect of the disclosure, there is provided a method for finishing a surface (for example smoothing or enhancing the surface wettability of the surface) of a component. The method comprises: installing the component in an apparatus configured to deliver a flow abrasives to the surface and to generate cavitation bubbles in a liquid contacting the surface using a cavitation generator; controlling the cavitation generator such that cavitation bubbles are generated to finish the surface by implosion of the cavitation bubbles; and controlling the flow of abrasives to the surface so as to finish the surface by abrasion.

The flow of abrasives may be a flow of slurry or a flow of dry abrasives.

The cavitation generator may comprise an ultrasonic generator configured to generate cavitation bubbles in the liquid contacting the surface by ultrasonic excitation in the liquid. The method may comprise controlling an amplitude and/or a frequency of the ultrasonic vibrations to control the generation of cavitation bubbles.

The cavitation generator may comprise a laser configured to generate cavitation bubbles in the liquid contacting the surface by laser excitation in the liquid. The method may comprise controlling a frequency, wavelength and/or an exposure time of the laser to control the generation of cavitation bubbles The cavitation generator may be configured to deliver a flow of liquid to the surface to generate cavitation bubbles. The method may comprise controlling the flow of liquid and the flow of abrasives independently of one another.

The method may further comprise pressurising the flow of liquid before delivering the flow of liquid along the surface. The method may also comprise pressurising the flow of abrasives before delivering the flow of abrasives along the surface.

The pressure and/or flow rate of the flow of liquid may be controlled to control an intensity of cavitation bubble generation and/or cavitation bubble implosion. The pressure and/or flow rate of the flow of abrasives may be controlled to control a degree of abrasion.

The flow of liquid and the flow of abrasives may be mixed at the surface. The mixed flow may be controlled to flow through a filtration system to separate the mixed flow into the liquid and the slurry.

The separated liquid and abrasives may be recirculated to the apparatus for delivery.

According to a second aspect of the disclosure, there is provided an apparatus for finishing a surface of a component, comprising: a cavitation generator configured to generate cavitation bubbles in a liquid contacting the surface; an abrasive supply line configured to deliver a flow of abrasives to the surface; and a controller configured to control the cavitation generator to generate cavitation bubbles to finish the surface by implosion of the cavitation bubbles and configured to control the flow of abrasives so as to finish the surface by abrasion.

The flow of abrasives may be a flow of slurry or a flow of dry abrasives.

The cavitation generator may comprise an ultrasonic generator configured to generate cavitation bubbles in the liquid contacting the surface by ultrasonic excitation in the liquid.

The cavitation generator may comprise a laser configured to generate cavitation bubbles in the liquid contacting the surface by laser excitation in the liquid.

The cavitation generator may be configured to deliver a flow of liquid to the surface to generate cavitation bubbles The controller may be configured to control the flow of liquid and the flow of abrasives independently of one another.

The liquid supply line may comprise a supply of liquid, a liquid pump and liquid pressure regulating means. The liquid pump and liquid pressure regulating means may be configured to pressurise the flow of liquid.

The abrasive supply line may comprise a supply of slurry, a slurry pump and slurry pressure regulating means. The slurry pump and slurry pressure regulating means may be configured to pressurise the flow of slurry.

The controller may be configured to control the pressure and/or flow rate of the flow of liquid to control an intensity of cavitation bubble generation and/or cavitation bubble implosion. The controller may be configured to control the pressure and/or flow rate of the flow of abrasives to control a degree of abrasion.

The liquid may comprise water. The slurry may comprise a suspended mixture of abrasive particles.

The apparatus may comprise a first passageway to deliver the flow of liquid to the surface, and a second passageway to deliver the flow of slurry to the surface.

The apparatus may comprise a nozzle, wherein the nozzle may comprise the first passageway and the second passageway The first passageway may be located at a central region of the nozzle and the second passageway may surround the first passageway.

The apparatus may further comprise a cavitation chamber in which the component is installed. The cavitation chamber may comprise a discharge line exiting from the cavitation chamber, wherein the discharge line carries a mixed flow of liquid and slurry.

The discharge line may comprise a discharge pressure regulator configured to regulate a back pressure in the cavitation chamber.

The controller may be configured to control the discharge pressure regulator to regulate the back pressure in the cavitation chamber.

The apparatus may comprise a filtration system configured to receive the mixed flow from the discharge line and separate the mixed flow into the liquid and the abrasives.

The filtration system may comprise a filtration tank having at least one filter. The filtration tank may be configured to receive the mixed flow of liquid and abrasives. In use, the filter may at least partially restrict the flow of abrasives within the filtration tank to separate the mixed flow into the liquid and the abrasives.

The filtration system may comprise a plurality of filters, each of the plurality of filters having different pore sizes.

The controller may be configured to recirculate the separated liquid to the liquid supply line and recirculate the separated abrasives to the abrasives supply line.

The surface may comprise a surface of an internal channel of the component.

The disclosure may comprise any combination of the features and/or limitations referred to herein, except combinations of such features as are mutually exclusive.

BRIEF DESCRIPTION OF THE DRAWINGS

Embodiments will now be described, by way of example, with reference to the accompanying figures, in which.

DETAILED DESCRIPTION OF THE DISCLOSURE

Figure 1:
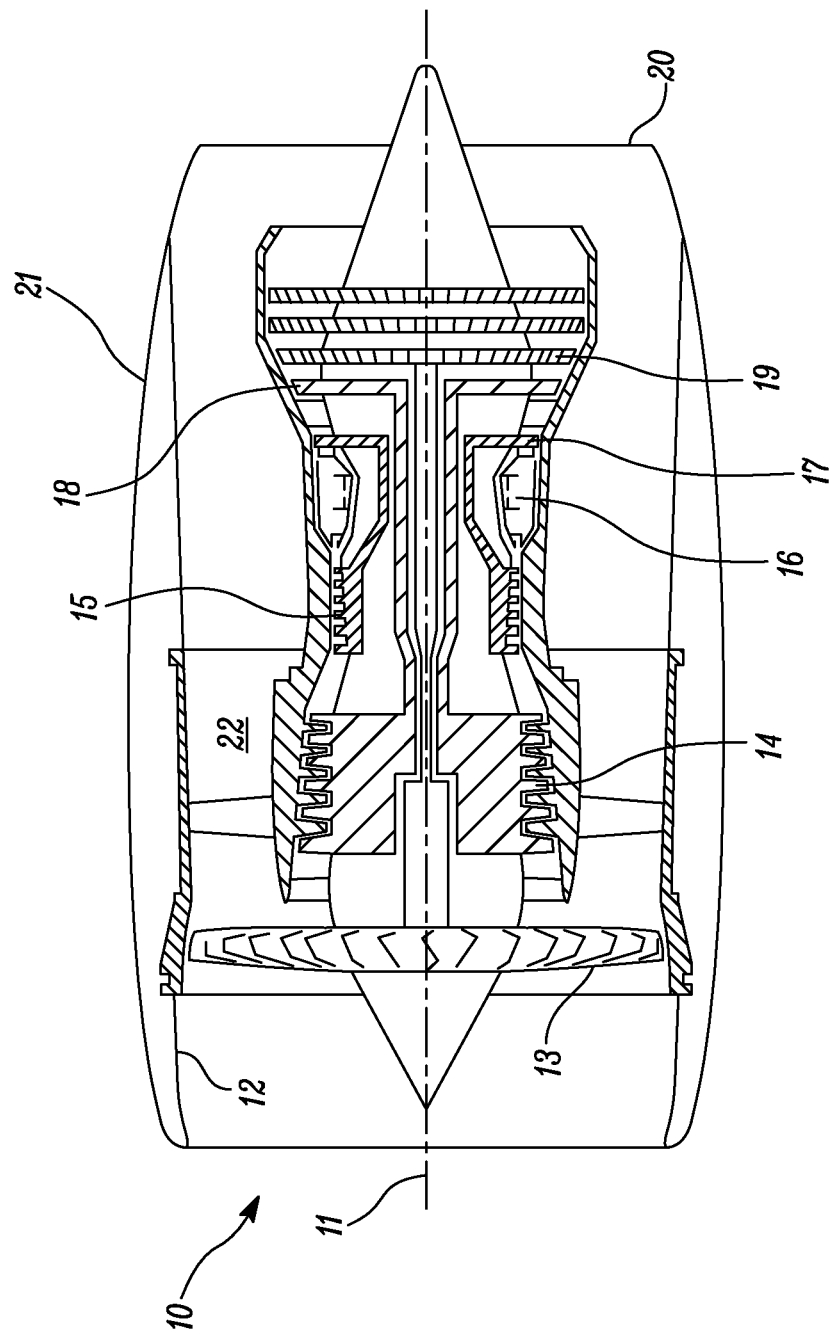
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Some components in a gas turbine engine may include complex internal channels with bends and narrow passages, such as pipes for conveying fuel from one location to another. Such components may be manufactured by a number of manufacturing techniques, and some of those techniques may result in rough surfaces or surfaces with poor surface wettability characteristics that may be surface finished to improve performance and/or geometric compliance. For example, such components may be manufactured by additive layering manufacturing (ALM). It may be advantageous to smooth an external surface or an internal surface of a component or to enhance its surface wettability. For example, in the case of a pipe, the internal surfaces may advantageously be smoothed to ensure that fuel can be efficiently and reliably conveyed to the required location.

Figure 2:
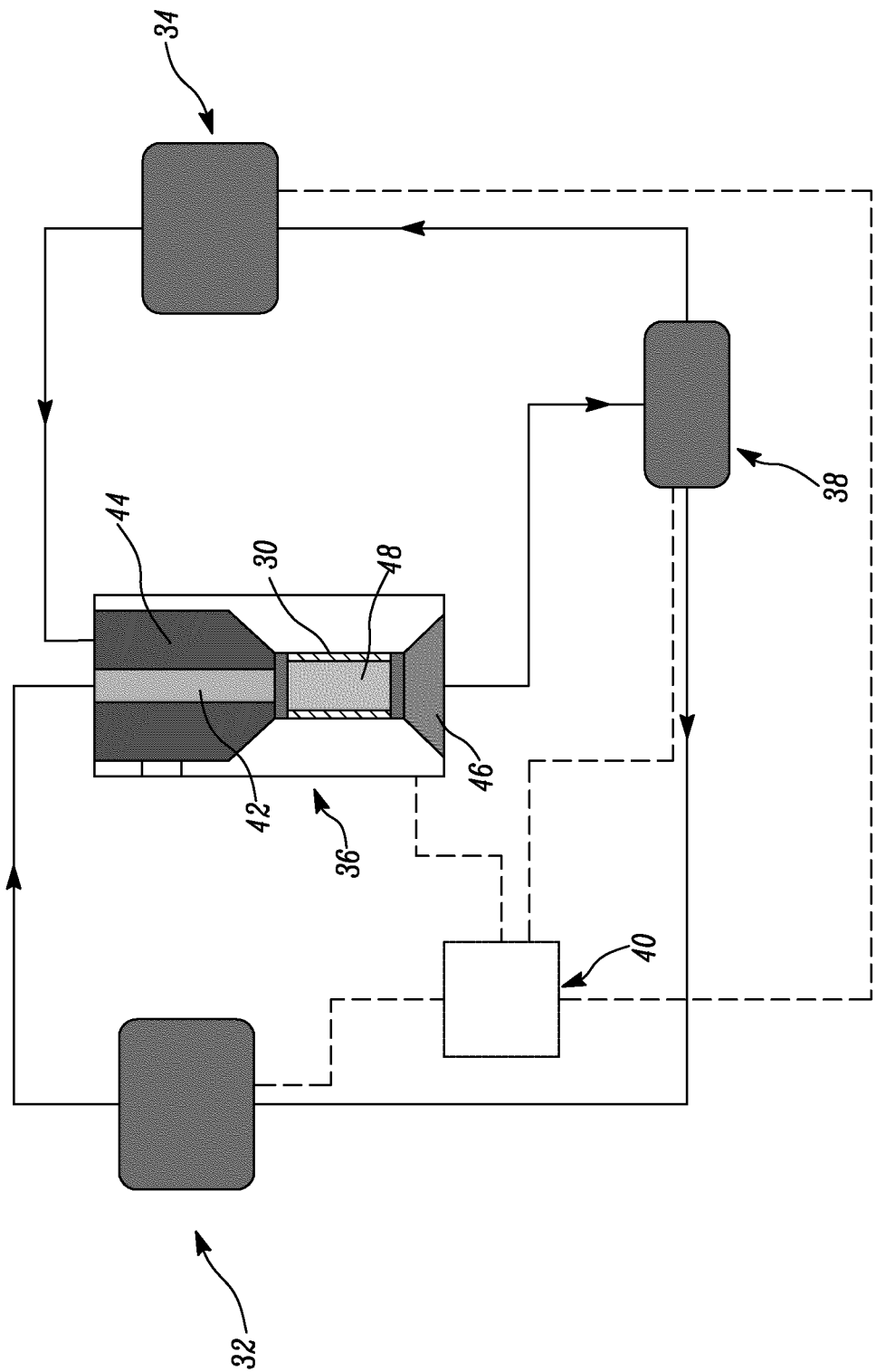
FIG. 2 is a schematic of an example apparatus for finishing a surface of a component.

FIG. 2 shows an example apparatus for finishing a surface of a component 30. In this example, the surface is a surface of an internal channel of a component 30. The apparatus comprises a liquid pressurisation system 32, a slurry pressurisation system 34, a cavitation chamber 36, a filtration system 38, and a controller 40. The liquid pressurisation system 32 is configured to pressurise a supply of liquid and deliver the liquid to the cavitation chamber 36. The slurry pressurisation system 34 is configured to pressurise a supply of slurry and deliver the slurry to the cavitation chamber 36. The cavitation chamber 36 comprises an inner passageway 42, which receives the liquid, and an outer passageway 44, which receives the slurry.

In this example, the component 30 is manufactured by ALM, and therefore may comprise surface irregularities caused by randomly distributed balling melts throughout the surface. The surface may further comprise stepping or staircase effects caused by inconsistencies in layer thickness. In other examples, the component 30 may be manufactured using any suitable manufacturing method.

In order to provide surface finishing (for example smoothing or wettability enhancement) to a surface, in particular, the internal channel of the component 30, the component 30 is installed in the cavitation chamber 36, such that the internal channel 48 of the component 30 is fluidically connected to receive liquid from the inner passageway 42 and receive slurry from the outer passageway 44. The controller 40 is configured to control the flow of liquid through the internal channel to generate cavitation bubbles and erode or plastically deform the surface of the internal channel by implosion of the cavitation bubbles.

Cavitation in the liquid is caused in particular due to a drop in hydrostatic pressure below the vapour pressure of the liquid at a given temperature. Without wishing to be bound by theory, the cavitation bubbles are thought to implode to generate shock waves which in turn generate micro jets. The micro jets are thought to cause micro pits or cracks on the surface of the internal channel, and thereby remove loosely bonded particles on the internal surface, erode or remove balling melts from the internal surface of a component 30 made by ALM, or plastically deform the surface, creating a micro-texture that increases the surface energy and enhances its surface wettability.

The controller 40 is further configured to control the flow of slurry through the internal channel of the component 30, to abrade the surface of the internal channel. The slurry comprises abrasive particles which abrade or remove balling melts from the surface of the internal channel.

A mixed flow of liquid and slurry exits the internal channel to a discharge line 46. The discharge line 46 carries the mixed flow of liquid and slurry to the filtration system 38. The filtration system 38 is configured to separate the mixed flow to produce a liquid and a slurry. The separated liquid and slurry are recirculated to the liquid pressurisation system 32 and the slurry pressurisation system 34, respectively.

In this example, the controller 40 is used to control the operation of the apparatus, in particular the liquid pressurisation system 32, the slurry pressurisation system 34, the cavitation chamber 36 and the filtration system 38. In other example embodiments, multiple controllers may be used to control the apparatus.

The operation of each system of the apparatus will be described in further detail with reference to FIGS. 3 to 7.

Figure 3:
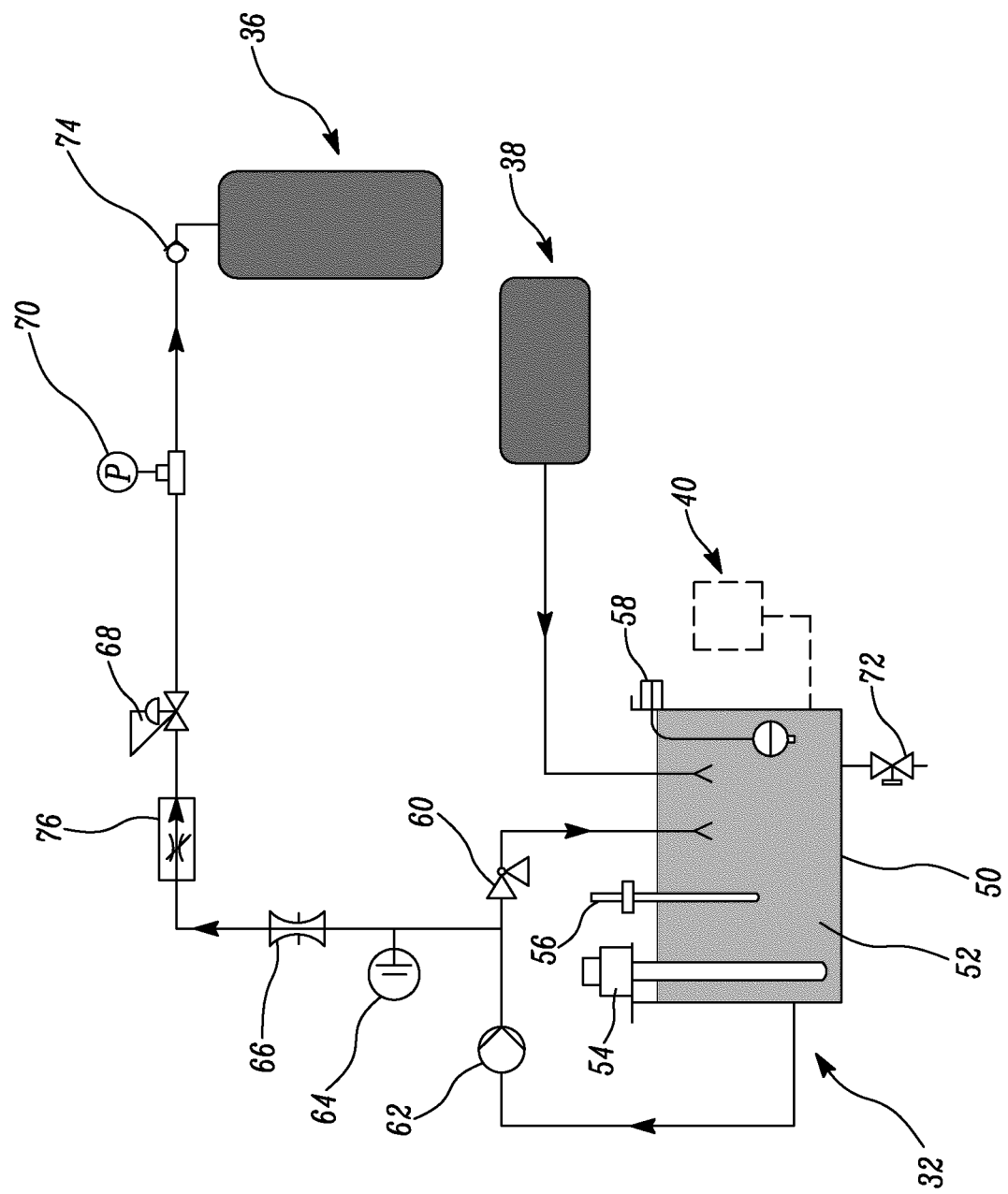
FIG. 3 is a schematic of an example of a liquid pressurisation system of the apparatus.

FIG. 3 shows a schematic diagram of an example liquid pressurisation system 32. The liquid pressurisation system 32 comprises a supply of liquid 52. In an example, the liquid 52 may be water. The liquid 52 may be provided in a liquid tank 50. The liquid tank comprises a heater 54 and a temperature sensor 56, which can be used to heat the liquid 52 and monitor its temperature. Increasing the temperature of the liquid 52 is thought to increase the cavitation intensity by increasing the generation of cavitation bubbles and increasing the intensity of the cavitation implosion.

There may also be a liquid level sensor 58 which is used to monitor the level of liquid 52 in the liquid tank. A liquid drainage valve 72 is provided in the liquid tank to remove liquid 52 from the liquid tank. The liquid pressurisation system 32 further comprises a liquid pump 62. In this example, the liquid pump 62 may be a positive displacement pump e.g. a piston pump. However, any other suitable pump can be used. The liquid pump 62 is used to draw liquid 52 from the liquid tank and pressurise the liquid 52. In an example, the liquid 52 is pressurised to around 250-350 bar, although it may pressurised as high as 1,000 bar in some examples. The liquid pump 62 is switched on or off according to the liquid level detected by the liquid level sensor. The liquid pressurisation system 32 may comprise a pressure relief valve 60 to relieve excess pressure in the flow line and return liquid 52 to the liquid tank.

The liquid pump 62 is configured to pump the liquid 52 to the cavitation chamber 36. The liquid pressurisation system 32 also comprises a liquid flow control device 76 to control the flow rate of the liquid 52. In an example, the liquid flow control device 76 may be a variable frequency drive. A liquid accumulator 64 is used to smooth out the pulsations in the flow of liquid 52 caused by the liquid pump 62. A liquid pressure regulator 68 is provided to control the pressure in the flow of liquid 52. In order to monitor the flow rate and the pressure of the liquid 52 flow, a liquid flow meter 66 and a liquid pressure sensor 70 are provided. A liquid valve 74 is provided to control the flow of liquid 52 to the cavitation chamber 36. In examples, the liquid valve 74 may be a check valve or a non-return valve.

The controller 40 is configured to receive data from the liquid flow meter 66, the liquid pressure sensor 70, the liquid level sensor and the liquid temperature sensor. The controller 40 is configured to control any or all of the liquid pump 62, the liquid heater 54 and the liquid flow control device 76 to regulate a cavitation intensity of the flow of liquid based on data received from the liquid flow meter 66, the liquid pressure sensor 70 and the liquid temperature sensor. In other examples, the controller 40 may be configured to display the data from the liquid flow meter 66, the liquid pressure sensor 70, the liquid level sensor and the liquid temperature sensor, to a user to permit manual control and variation of the liquid pump 62 and/or liquid valve 74 by user input.

Figure 4:
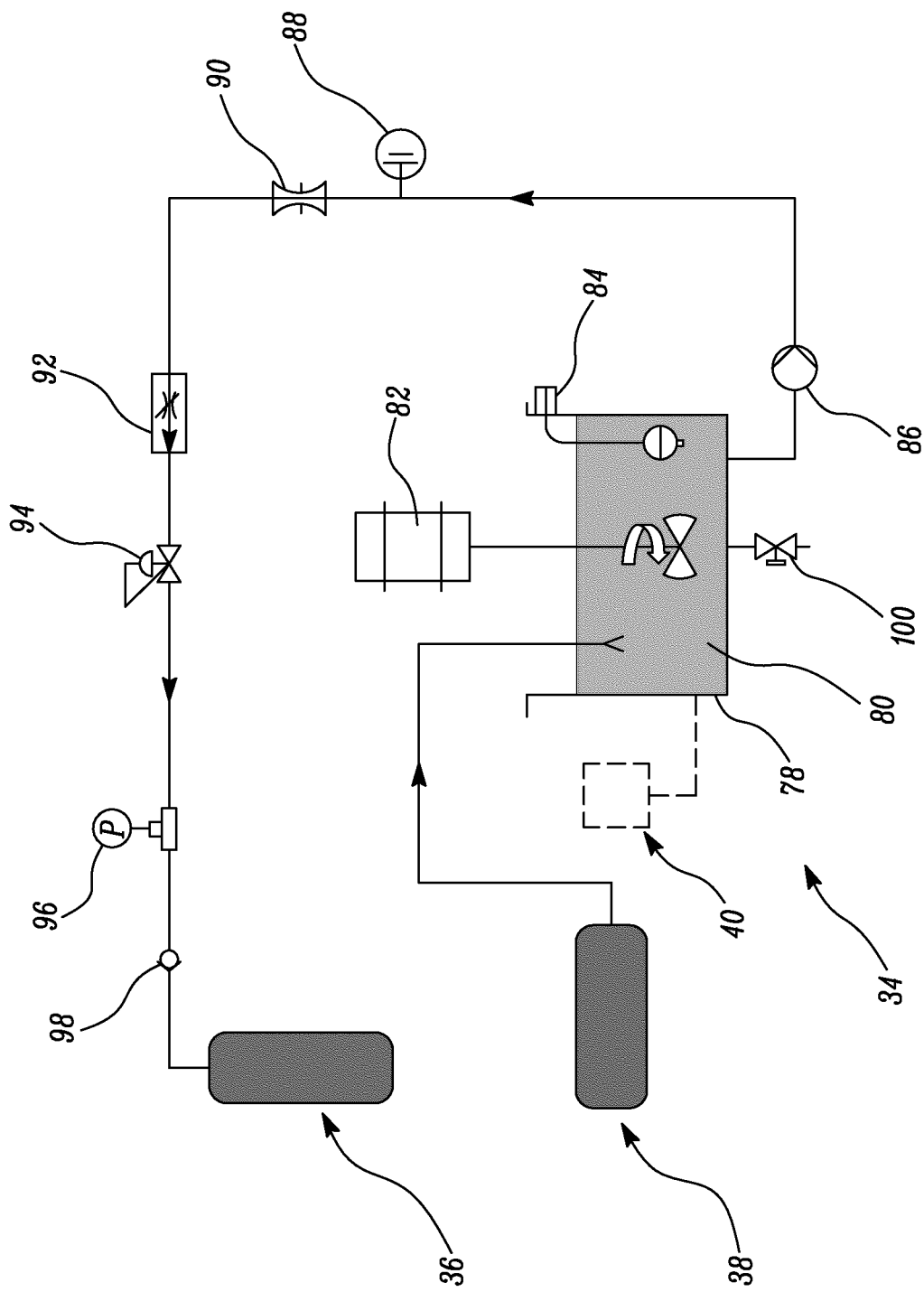
FIG. 4 is a schematic of an example of a slurry pressurisation system of the apparatus.

FIG. 4 shows a schematic of an example slurry pressurisation system 34. The slurry pressurisation system 34 comprises a supply of slurry 80. The slurry 80 comprises a suspended mixture of abrasive particles. The slurry 80 may comprise a concentration of up to 30% (by wt.) of abrasive particles suspended in a liquid. The abrasive particles may have a mean particle size of between 5 μm and 500 μm. The particle size may also be greater than 500 μm. The abrasive particles may be formed from any suitable abrasive material such as, for example, silicon carbide, cubic boron nitride, alumina, hematite, quartz, and apatite.

The slurry pressurisation system 34 comprises a slurry tank 78 which contains the slurry 80. The slurry tank 78 comprises a slurry stirrer 82, which mixes and agitates the slurry 80 in the tank and maintains homogeneity of the slurry 80. The stirrer 82 may be powered by an electric motor. The slurry tank 78 may also comprise suitable temperature control equipment to control the temperature of the slurry 80. There is also provided a slurry level sensor 84 which is used to monitor the level of slurry 80 in the slurry tank 78. A slurry drainage valve 100 is provided in the slurry tank 78 to remove slurry 80 from the slurry tank 78.

A slurry pump 86 is configured to pump the slurry 80 to the cavitation chamber 36. In an example, the slurry pump 86 may be a positive displacement pump. The slurry pump 86 is configured to pressurise the slurry 80. In an example, the slurry 80 may be pressurised to around 100 bar. The slurry pump 86 is switched on or off according to the slurry level detected by the slurry level sensor 84. The slurry pressurisation system 34 may comprise a pressure relief valve (not shown) to relieve excess pressure in the slurry flow line and return slurry 80 to the slurry tank 78.

The slurry pressurisation system 34 also comprises a slurry flow control device 92 to control the flow rate of the slurry 80. In an example, the slurry flow control device 92 may be a variable frequency drive. A slurry accumulator 88 is used to smooth out the pulsations in the slurry flow caused by the slurry pump 86. A slurry pressure regulator 94 is provided to control the pressure in the slurry flow. In order to monitor the flow rate and the pressure of the slurry flow, a slurry flow meter 90 and a slurry pressure sensor 96 are provided. A slurry valve 98 is provided to control the slurry flow to the cavitation chamber 36. In examples, the slurry valve 98 may be a check valve or a non-return valve.

The controller 40 is configured to receive data from the slurry flow meter 90, the slurry pressure sensor 96, the slurry level sensor 84 and the slurry temperature sensor. The controller 40 is configured to control one or both of the slurry pump 86 and the slurry flow control device 92 based on the received data, to adjust the pressure, flow rate and temperature of the slurry 80. In other examples, the controller 40 may be configured to display data from the slurry flow meter 90, the slurry pressure sensor 96, the slurry level sensor 84 and the slurry temperature sensor, to a user to permit manual control and variation of the slurry pump 86 and/or slurry valve 98 by user input.

Figure 5:
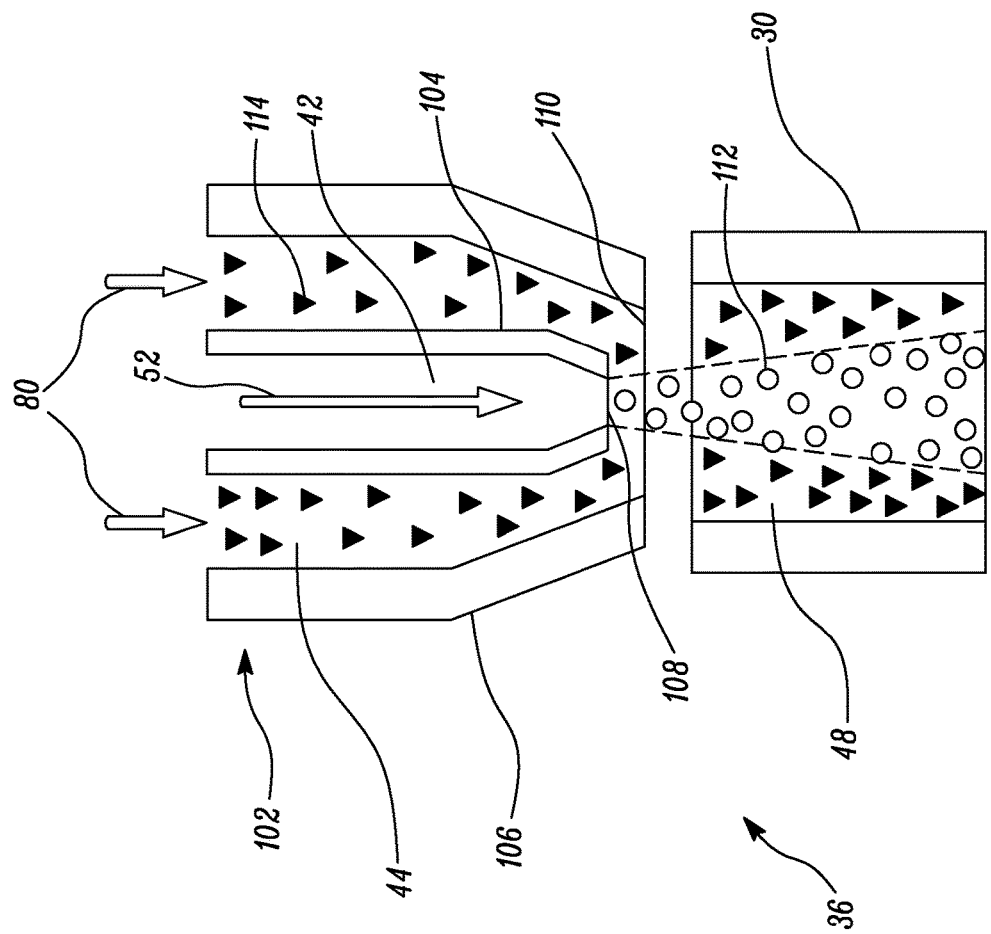
FIG. 5 is a sectional view of an example of a nozzle of the apparatus.

FIG. 5 shows a detailed representation of an example arrangement of a cavitation chamber 36. In this example, the component 30 is shown as a simple tube having an internal channel 48. In other examples, the component 30 may be any shape and may have any number of complex channels for surface finishing. As discussed previously, the component 30 may be manufactured using ALM, and the internal channel may have a rough surface, for example caused by balling melts, or suboptimal surface wettability.

The pressurised liquid 52 delivered from the liquid pressurisation system 32 is received in the inner passageway 42. The slurry 80 delivered from the slurry pressurisation system 34 is received in the outer passageway 44. In this example, the inner passageway 42 and outer passageway 44 are present in a nozzle 102. The nozzle 102 comprises an outer tube 106 and an inner tube 104 disposed within the outer tube 106. The space within the inner tube 104 comprises the inner passageway 42 and the space between the outer tube 106 and the inner tube 104 comprises the outer passageway 44. The inner passageway 42 and the outer passageway 44 are thus concentrically arranged. The inner tube 104 is located at a central region of the nozzle 102, in particular along its central axis. The inner tube 104 comprises an inner outlet 108 and the outer tube 106 comprises an outer outlet 110. In this example, the outer tube 106 surrounds the inner tube 104. In this example the inner outlet 108 is offset from the outer outlet 110, such that the inner outlet 108 is within the end of the nozzle 102. The offset is referred to as stand-off distance of the nozzle. The stand-off distance affects the surface finish required and the effective length of cavitation stream inside the workpiece. However, in other examples, the inner outlet 108 may be placed within the end of the nozzle 102. In other examples, the inner outlet 108 may protrude out of the nozzle outlet 110. The nozzle 102 can be manufactured from any suitable wear resistant material.

In an example, the cavitation chamber 36 may comprise an enclosed space containing the component 30 and the nozzle 102. The component 30 is installed in the cavitation chamber 36, such that an entrance of the internal channel 48 is fluidically connected to the inner and outer outlets of the nozzle 102, to receive the flow of liquid 52 and the flow of slurry 80 from the inner passageway 42 and outer passageway 44, respectively.

An exit of the internal channel, downstream of the entrance of the internal channel 48, is also fluidically connected to the discharge line 46 to discharge the mixed flow of liquid 52 and slurry 80 to the filtration system 38. The component 30 may be retained in the chamber with the use of any suitable securing means, such as by clamping, by a frictional fit or by fasteners.

In this example, cavitation in the liquid 52 occurs due to the change in pressure from the high pressure within the inner passageway 42 to the lower pressure outside the inner outlet 108. In particular cavitation is caused by a drop in hydrostatic pressure below the vapour pressure of the liquid 52 at a given temperature. The diameter of the inner outlet 108 is selected such that cavitation bubbles 112 are generated in the liquid 52. The diameter of the inner passageway 42 tapers down to the inner outlet 108, such that the inner passageway 42 is narrowest at the inner outlet 108. The flow of liquid 52 is partially restricted by the inner outlet 108. By partially restricting the flow of liquid 52 as it passes through the inner outlet 108, cavitation bubbles 112 may be generated in the liquid 52 by a hydrodynamic effect.

As the slurry 80 flows through the outer outlet 110 and into the internal channel 48 of the component 30, the abrasive particles 114 in the slurry 80 strike the surface of the internal channel 48 and remove surface irregularities by abrading the surface. By directing the slurry 80 into the internal channel via the outer outlet 110, the slurry 80 can flow adjacent to the surface of the internal channel 48 and therefore the abrasive particles 114 can have a high level of interaction with the surface. The liquid 52 and the slurry 80 may be controlled to flow simultaneously through the internal channel 48. In this example, the implosion or collapse of the cavitation bubbles 112 in the liquid 52 may generate shock waves, which cause the abrasive particles 114 in the adjacent slurry 80 to accelerate. Accelerating the abrasive particles 114 can cause the abrasive particles 114 to strike the surface of the internal channel 48 at a faster rate and therefore result in a faster rate of abrasion.

It is thought that the abrasive particles 114 in the slurry 80 may have surface imperfections which trap gases while travelling at high speeds, resulting in a local pressure drop, and thereby generate more cavitation bubbles 112 to accelerate the abrasive particles 114 and enhance the finishing.

It is thought that whilst cavitation bubbles 112 may be effective in removing relatively large imperfections in the surface of the internal channel, such as loosely bonded particles and balling melts, they may be less effective (at least without abrasive particles 114) in smoothing or removing the bulk material of the component 30. The abrasive particles 114 in the slurry 80 abrade the surface of the internal channel, and may smooth it to a finer finish (e.g. a relatively lower roughness) than the cavitation bubbles 112 alone.

The slurry 80 comprises abrasive particles 114 suspended in a low viscosity liquid, therefore the risk of abrasive particle accumulation at narrow portions or complex bends in the component 30 is reduced when compared to methods relying on a higher viscosity liquid.

The cavitation intensity relates to the amount of cavitation bubbles 112 which are generated in the liquid 52 and/or to the intensity of implosion of the cavitation bubbles 112. The cavitation chamber 36 may comprise sensors 142 (FIG. 7) which monitor the cavitation intensity of the liquid 52, which send data to the controller 40. The controller 40 may use this data to control the pressure, flow rate and temperature of the liquid 52 to control the level of erosion of the surface of the component 30. Similarly, the controller 40 may control the pressure, flow rate and temperature of the slurry 80 to control the level of abrasion of the surface of the component 30. Different values of surface roughness can be achieved by controlling the respective parameters of the liquid 52 and the slurry 80.

The size of the abrasive particles 114 in the slurry 80 can be varied to produce different levels of surface finishing in the internal channel of the component 30. Large abrasive particles, for example in the order of 500 μm or greater, may be used in the slurry 80. The large abrasive particles can cause a high degree of abrasion in the internal channel and can be used to achieve a relatively rough surface finish, or to remove large amounts of material to achieve the required surface finish. Small abrasive particles, for example in the order of 5-500 μm, may be used in the slurry 80. The small abrasive particles cause a low degree of abrasion in the internal channel and can be used to achieve a finer surface finish. In another example, the slurry 80 may comprise a mixture of large and small abrasive particles, in relative concentrations selected to achieve the required surface finish.

Whilst in this example, the liquid 52 and slurry 80 are controlled to flow simultaneously through the internal channel, the apparatus is configured to control the flow of liquid 52 independently of the flow of slurry 80.

The slurry valve 98 may be closed and the liquid valve 74 may be opened to only allow the liquid 52 to flow to the inner passageway 42. In this configuration, only the liquid 52 is controlled to flow through the internal channel of the component 30 such that cavitation bubbles 112 are generated to erode the internal channel. Often in components manufactured by ALM, the internal channels may have large surface irregularities, such as balling melts or stepping effects on the surface. The internal channel of the component 30 may be blocked as a result. The high pressure flow of liquid and cavitation of the liquid 52 to generate cavitation bubbles 112 can help to clear the blocked internal channel before performing further surface finishing with a combination of liquid flow to generate cavitation bubbles 112 and the flow of slurry 80, or a flow of slurry 80 alone.

Likewise, the slurry valve 98 may be opened and the liquid valve 74 may be closed to only allow the slurry 80 to flow to the outer passageway 44 and then to the internal channel of the component 30. The flow of slurry 80 allows the surface of the internal channel to be finished to a finer finish by the abrasive particles 114. This may be advantageous as a secondary finishing process used after a primary finishing process of the flow of liquid and generation of cavitation bubbles 112. Alternatively, if the component 30 has low wall thickness, the level of surface finishing required may be low to prevent excess removal of material from the internal channel and subsequent weakening of the component 30. In such an example, the apparatus can be controlled to only allow a flow of slurry 80 through the internal channel to achieve the required surface finish.

Figure 6:
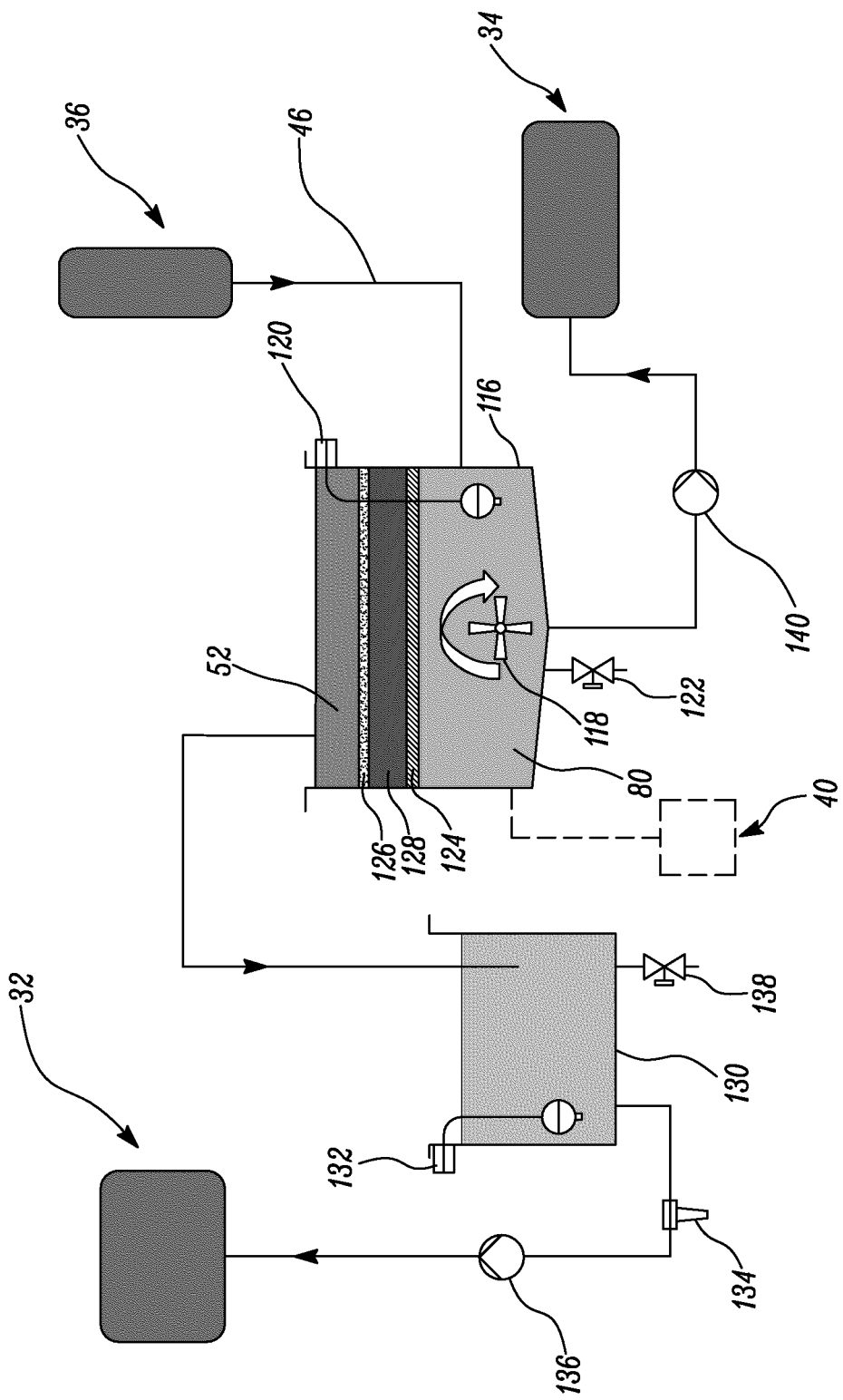
FIG. 6 is a schematic of an example of a filtration system of the apparatus.

FIG. 6 shows an example arrangement of the filtration system 38. The filtration system 38 comprises a filtration tank 116, which is configured to receive the mixed flow of liquid 52 and slurry 80 from the discharge line 46. The discharge line 46 delivers the mixed flow of liquid 52 and slurry 80 towards the bottom of the filtration tank 116. The filtration system 38 also comprises a mixer 118 which agitates the mixed liquid 52 and slurry 80 within the tank.

The filtration system 38 comprises at least one filter, the filter extending across the width of the filtration tank 116. In this example, two filters, a fine filter 126 and a coarse filter 124, are present in the filtration tank 116. The fine filter 126 has a smaller pore size than the coarse filter 124, preventing particles larger than the pore size from passing through the fine filter 126. In this example, the fine filter 126 and the coarse filter 124 are wire mesh filters; however in other examples, other types of filter may be used. The pore size can be varied by selecting different mesh sizes in the wire mesh filters.

The filtration system 38 further comprises a filtration level sensor 120, which monitors the level of the mixed liquid 52 and slurry 80 within the filtration tank 116. A filtration tank drainage valve 122 is included to remove liquid 52 and slurry 80 from the filtration tank 116.

In operation, the controller 40 operates the stirrer to circulate the mixed liquid 52 and slurry 80 within the filtration tank 116 and prevents the abrasive particles in the slurry 80 from settling at the bottom of the filtration tank 116. The liquid 52 rises towards the top of the filtration tank 116 and passes through both the coarse filter 124 and the fine filter 126. The flow of the abrasive particles in the slurry 80 is restricted by the filters. In particular, the fine filter 126 restricts the flow of small particles present in the mixed liquid and slurry, which may include debris which was eroded or abraded from the component. The coarse filter 124 restricts the flow of the abrasive particles in the slurry. The mixed liquid 52 and slurry 80 is separated, with the liquid 52 at the top of the filtration tank 116, the slurry comprising abrasive particles 80 at the bottom of the filtration tank 116, and a mixture of small particles 128 between the fine and coarse filters. The mixture of small particles 128 may be removed from the filtration tank as a waste product.

The separated liquid 52 at the top of the tank is collected from the filtration tank 116 to a collection tank 130. The collection tank 130 comprises a collection level sensor 132 and a collection tank drainage valve 138. A liquid transfer pump 136 is used to pump the liquid 52 from the collection tank 130 to the liquid tank of the liquid pressurisation system 32. The liquid 52 is pressurised in the liquid pressurisation system 32 and re-used for surface finishing the internal channel of the component 30.

Liquid 52 collected in the collection tank 130 from the filtration tank 116 may contain particulates, which may include particles smaller than the pore size of the fine filter 126, or debris from the internal channel of the component 30, which was eroded or abraded away during the surface finishing. To remove the particulates, the liquid 52 is pumped through a micro-filter 134. The micro-filter 134 has a very fine pore size, which is smaller than the fine filter 126. In this example, a single micro-filter 134 is shown; however, in other examples, multiple micro-filters may be used, each with different pore sizes.

The slurry 80 collected at the bottom of the filtration tank 116 is pumped to the slurry tank 78 in the slurry pressurisation system 34 by a slurry transfer pump 140. The slurry 80 can be pressurised in the slurry pressurisation system 34 and re-used for surface finishing the internal channel of the component 30 by abrasion.

Figure 7:
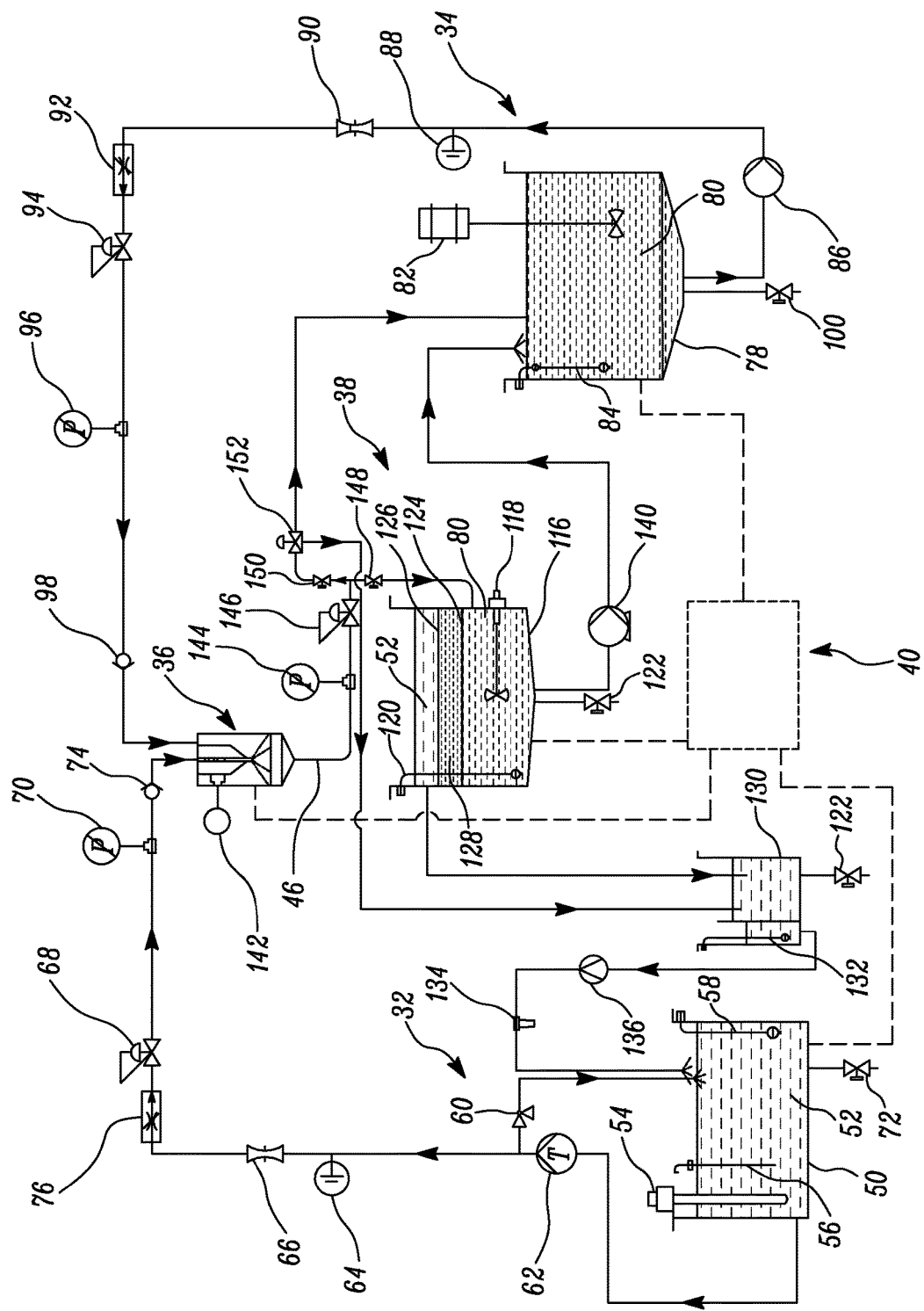
FIG. 7 is a schematic of a detailed example apparatus for finishing a surface of a component.

FIG. 7 shows a detailed schematic of an example apparatus for finishing a surface of a component 30 according to the present disclosure. The apparatus comprises the liquid pressurisation system 32, the slurry pressurisation system 34, the cavitation chamber 36, the filtration system 38 and the controller 40.

As shown, a discharge pressure gauge 144 and a discharge pressure regulator 146 are provided in the discharge line 46. The discharge pressure gauge 144 is used to monitor the pressure of the flow exiting the cavitation chamber 36. The discharge pressure regulator 146 can be used to control the pressure of the liquid and the slurry within the cavitation chamber 36. In particular, the discharge pressure regulator 146 can be used to regulate a back pressure in the cavitation chamber 36. The controller 40 can control the operation of the discharge pressure regulator 146. By controlling the back pressure, a level of surface finishing of the surface can be altered.

The apparatus further comprises a first exit valve 148, a second exit valve 150, and a three-way valve 152, downstream of the cavitation chamber 36 along the discharge line 46. The first exit valve 148 can be opened to direct flow in the discharge line 46 to the filtration system 38, in particular the filtration tank 116. The second exit valve 150 can be opened to direct flow in the discharge line 46 to the three-way valve 152. The three-way valve 152 can selectively control either liquid 52 to flow to the collection tank 130 or control slurry 80 to flow to the slurry tank 78.

The apparatus can be operated in number of different configurations, depending on the surface finishing requirements of the component 30. As described above, in one configuration, the apparatus can be operated such that the liquid pressurisation system 32 delivers a flow of liquid 52 to the cavitation chamber 36, and the slurry pressurisation system 34 delivers a flow of slurry 80 to the cavitation chamber 36. The controller 40 can control the flow of liquid 52 along the surface of the component 30 to generate cavitation bubbles to erode the surface by implosion of the cavitation bubbles and simultaneously control the flow of slurry 80 to abrade the surface. The mixed flow of liquid 52 and slurry 80 exiting the cavitation chamber 36 is carried via the discharge line 46. In this configuration, the first exit valve 148 is opened and the second exit valve 150 remains closed, directing the mixed flow of liquid 52 and slurry 80 to the filtration system 38 to be separated.

In another configuration, only a flow of liquid 52 is directed from the liquid pressurisation circuit to the cavitation chamber 36. The controller 40 can control the flow of liquid 52 to generate cavitation bubbles to erode the surface by implosion of the cavitation bubbles. This may be used for example, to clear a blocked internal channel of a component 30. In this configuration, the discharge line 46 only carries a flow of liquid 52 away from the cavitation chamber 36. When only a flow of liquid is used for surface finishing the component, the first exit valve 148 is closed and the second exit valve 150 is opened, and the three-way valve 152 is controlled to direct the flow of liquid 52 to the collection tank 130. The liquid 52 may contain varying amounts of particle matter, which in examples, may include debris eroded away from the component 30 or abrasive particles remaining in the component 30 from a prior finishing process using slurry 80. As described previously, the liquid transfer pump 136 is controlled to pump the liquid 52 from the collection tank 130 through the micro-filter 134 to remove the particle matter. The liquid 52 is pumped to the liquid tank, where it can be pressurised and reused for surface finishing in the cavitation chamber 36.

In another configuration, only a flow of slurry 80 is directed from the slurry pressurisation system 34 to the cavitation chamber 36, where the flow of slurry 80 is controlled to abrade the surface of the component 30. This may be used when the level of surface finishing required is low, requiring only abrasion by slurry 80. In this configuration, the discharge line 46 exiting the cavitation chamber 36 carries only a flow of slurry 80. In this configuration where only a flow of slurry is used for surface finishing, the first exit valve 148 is closed and the second exit valve 150 is opened, and the three-way valve 152 is controlled to direct the flow of slurry 80 to the slurry tank 78. In an example, this configuration may be used when a continuous flow of slurry 80 is required to flow through the cavitation chamber 36 to abrade the surface of the component 30.

Whilst it has been described that the apparatus is used for finishing an internal surface of a component 30, it will be appreciated that the apparatus can also be used for finishing an external surface of a component 30. By controlling the flow parameters, i.e. the pressure, flow rate and temperature of the liquid 52 and the pressure, flow rate and particle size of the slurry 80, the apparatus can be used for a number of different operations on the component 30. For example, the surface of the component 30 may be cleaned by the generated cavitation bubbles in the liquid 52 and the subsequent collapse of the cavitation bubbles. In another example, the flow parameters can be controlled to perform surface treatment on the surface of the component 30 and modify its mechanical properties by inducing compressive residual stresses at the surface.

Figure 8:
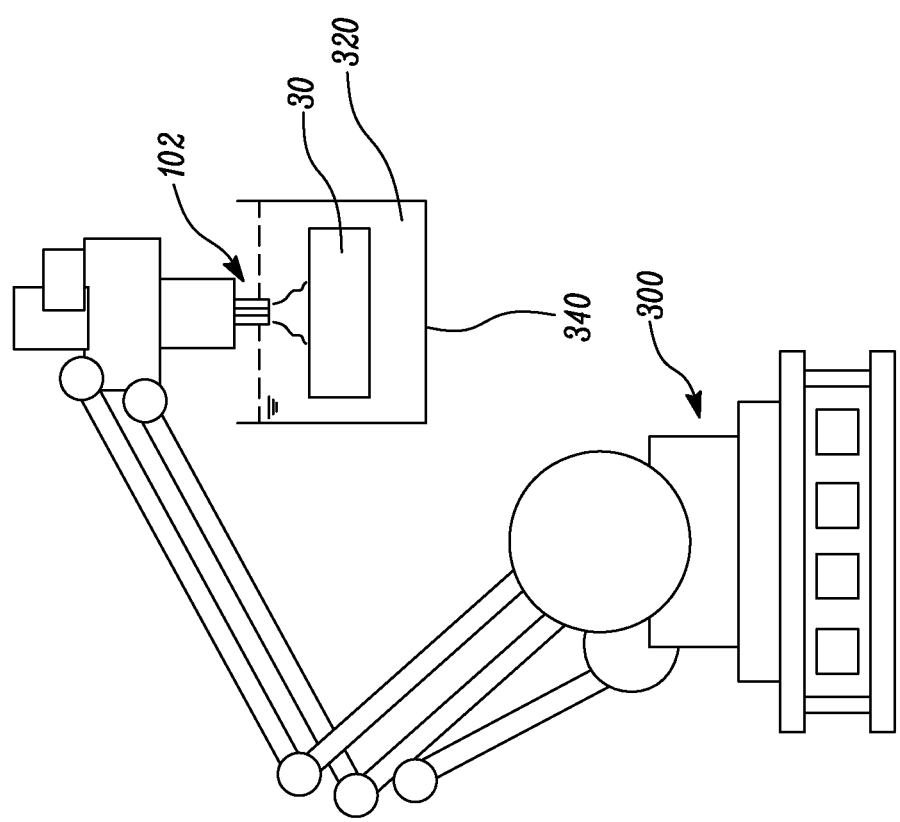
FIG. 8 shows an apparatus according to another embodiment of the present disclosure.

FIG. 8 shows an alternative embodiment of the present disclosure, in which the nozzle 102 is mounted to a robotic arm 300. The robotic arm 300 may be used to manipulate the nozzle 102 to perform surface finishing on multiple areas of the component 30. The nozzle 102 can be mounted to an end effector of the robotic arm 300. The robotic arm 300 may be articulated and configured to move in six degrees of freedom. As described previously, the nozzle 102 is configured to receive a flow of liquid from the liquid pressurisation system 32 and a flow of slurry from the slurry pressurisation system 34.

The component 30 may be installed in a chamber, such as tank 340. In another example, the component 30 may be retained by a fixture. In this example, the tank 340 contains a bath of slurry 320. The component 30 may be submerged within the bath of slurry 320. The outlet of the nozzle 102 may also be submerged within the tank 340. The flow of liquid can be controlled to generate cavitation bubbles to erode the surface of the component 30 by implosion of the cavitation bubbles. The flow of slurry can be controlled to abrade the surface of the component 30. The surface of the component 30 may comprise an external surface or an internal surface. The robotic arm 300 can be controlled to vary the angle of the nozzle 102 to direct the flow of cavitation bubbles and the flow of slurry from the nozzle 102 to the component 30. The surface finish achieved can be varied as a result of varying the angle of the nozzle 102. The pressure and flow rate of the liquid and the slurry can be controlled to vary the degree of surface finishing. The liquid and slurry exiting the nozzle 102 may be collected by the tank 340. The filtration system 38 may be used to separate the collected liquid and slurry.

Figure 9:
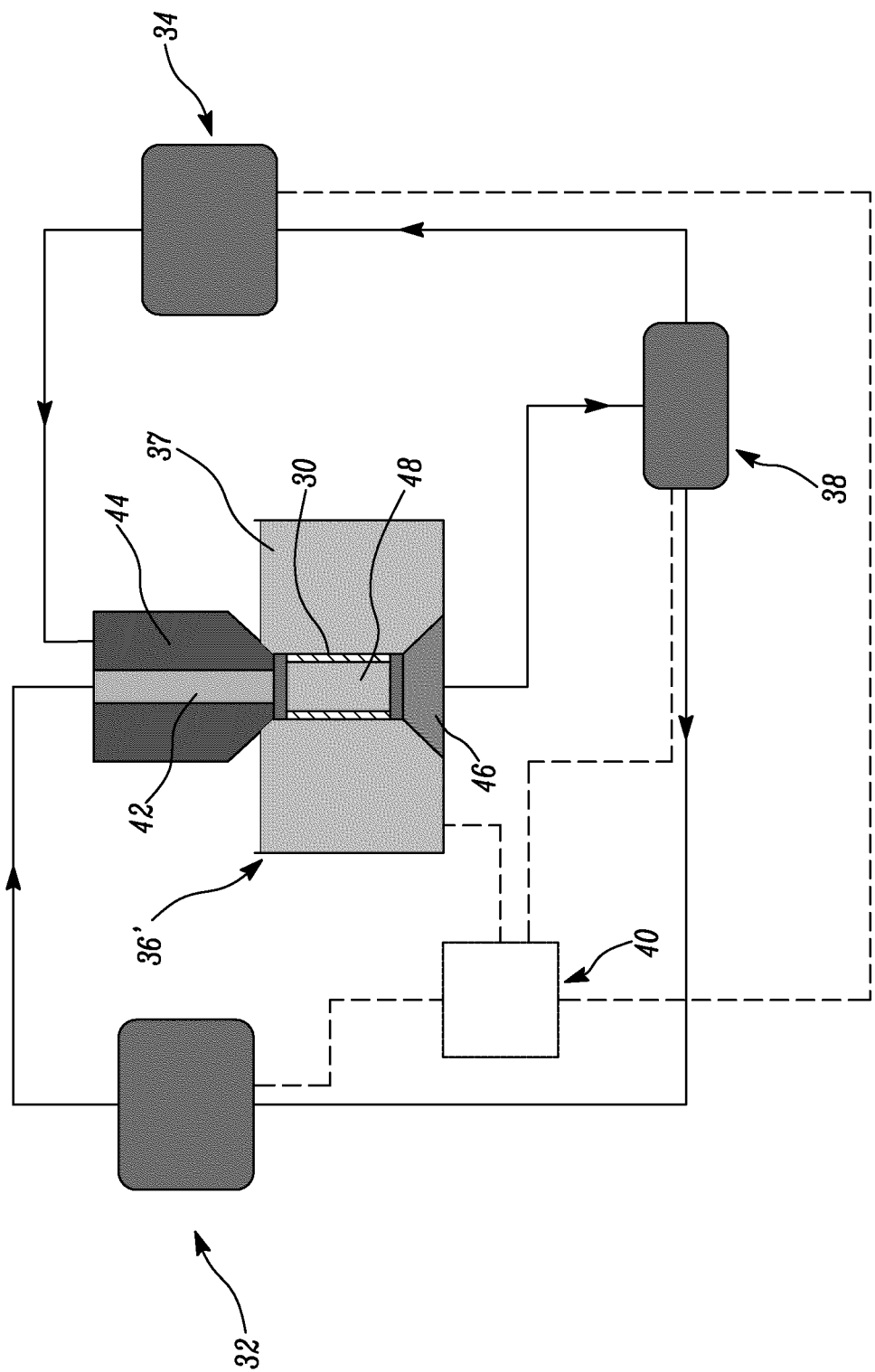
FIG. 9 is a schematic of another example apparatus for finishing a surface of a component in which the cavitation chamber is modified.

FIG. 9 illustrates another alternative embodiment that is similar to the embodiment of FIG. 2 but with an alternative arrangement of the cavitation chamber 36'. The cavitation chamber 36' has the same nozzle arrangement 102 with inner and outer passageways 42, 44 described above with reference to FIG. 5. However, unlike the cavitation chamber 36 of FIG. 2, the cavitation chamber 36 of FIG. 9 includes a tank 37 open to atmospheric pressure and filled with a liquid, in this case pure water.

The nozzle 102 and component 30 are immersed in the liquid in the tank 37. Immersing the component 30 in the liquid conveniently allows for some cavitation and abrasion to occur adjacent an external surface of the component 30, providing some finishing to the external surface. Although not illustrated in FIG. 9, the filtration system 38 may be adapted to return liquid to the tank 37 to maintain the level of the tank 37.

Figure 10:
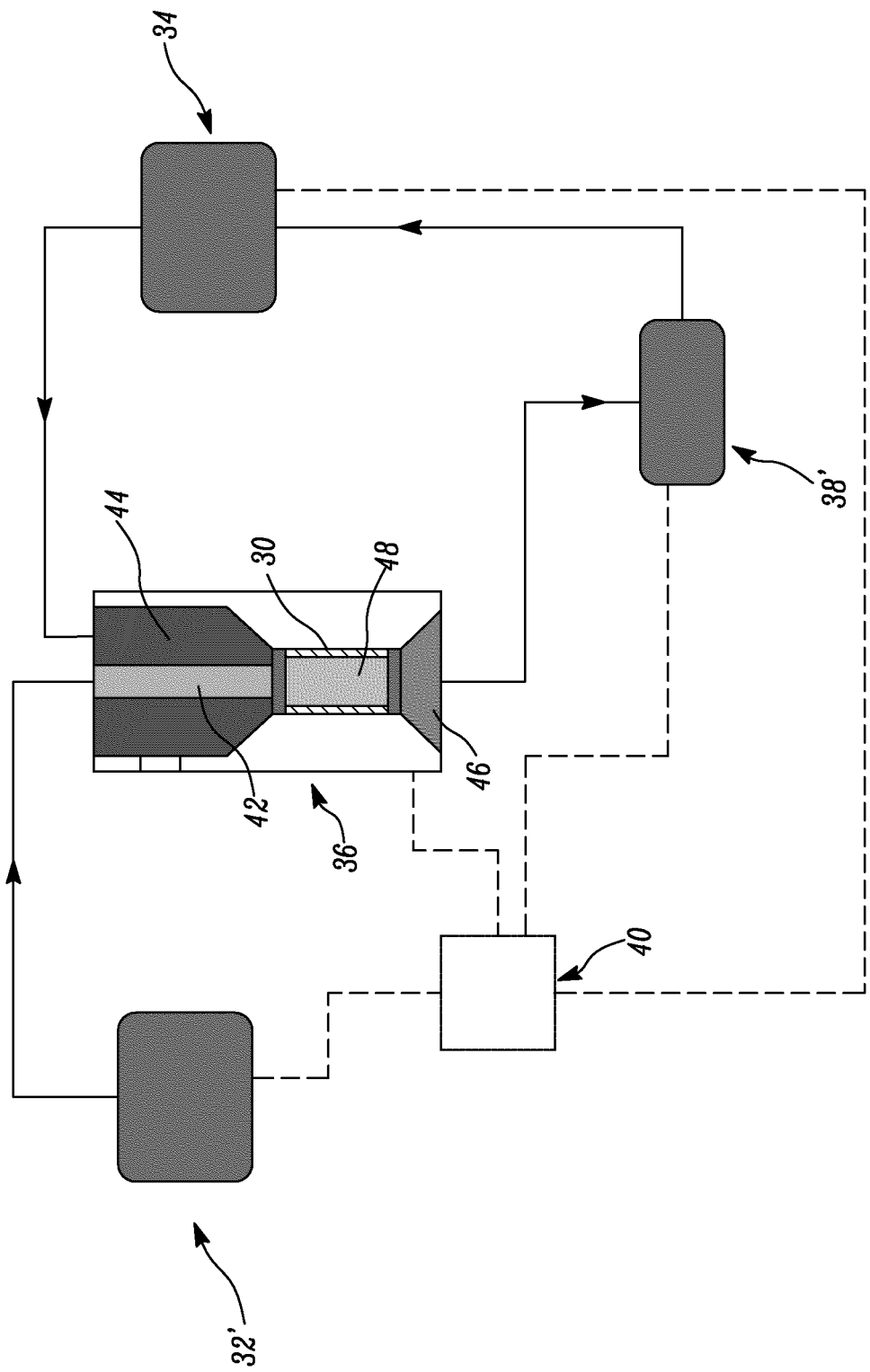
FIG. 10 is a schematic of another example apparatus for finishing a surface of a component in which cavitation is induced by an ultrasonic transducer or a laser.

FIG. 10 illustrates another alternative embodiment in which the liquid pressurisation system 32 is replaced with a different source of cavitation generation 32'.

In a first example according to FIG. 10, cavitation bubbles are generated by ultrasonic excitation of the working fluid, which in FIG. 10 is the supply of slurry flowing through the outer passageway 44 of the nozzle 102 and into the internal channel of the component 30. An ultrasonic generator 32' generates ultrasonic vibrations which are then communicated to the working fluid via the nozzle 102. In particular, the ultrasonic generator 32' may be coupled to the inner tube 104 of the nozzle 102 so that the nozzle can transmit the vibrations into the fluid. In some cases the inner tube 104 may act as or be coupled to an ultrasonic horn that amplifies the vibrations.

The vibration frequency and amplitude of the nozzle or horn may be controlled by controller 40 in order to generate cavitation at different intensities. Suitable frequencies of the order 0 to 100 kHz may be used, with vibration amplitudes of the ultrasonic horn of the order of 0 to 150 μm, though these will depend to some extent on the geometry of the arrangement. If the chamber is pressurised, its pressure, and indeed the slurry inlet pressure, may also be controlled to finish the surface of the component as desired.

In a second example according to FIG. 10, cavitation bubbles are generated by laser excitation of the working fluid, which in this case is the supply of slurry flowing through the outer passageway 44 of the nozzle 102 and into the internal channel of the component 30. In this case a laser 32' is focused on the component surface and concentrated to generate plasma in the fluid surrounding the component, resulting in cavitation.

The laser type, wavelength, frequency and exposure time may be selected and/or controlled by the controller 40 so as to generate cavitation effects at the desired intensity. Suitable laser wavelengths may be in the range of 193 to 10,600 nanometres, with exposure times of the order of 1 femtosecond to 1 second. If the chamber is pressurised, its pressure, and indeed the slurry inlet pressure, may also be controlled to finish the surface of the component as desired.

In both of these cases, the filtration system 38 of FIGS. 2 and 6 may be replaced with a simpler system 38'. Specifically, the system 38' may not be required to filter the output received via the discharge line 46 or return liquid to a liquid pressurization system 32, and may instead only return the slurry to the slurry pressurization system 34. In some cases a combination of a liquid pressurisation system and an ultrasonic generator 32' and/or laser 32' may be used for cavitation, in which case a filtration system 38 may still be provided.

Figure 11:
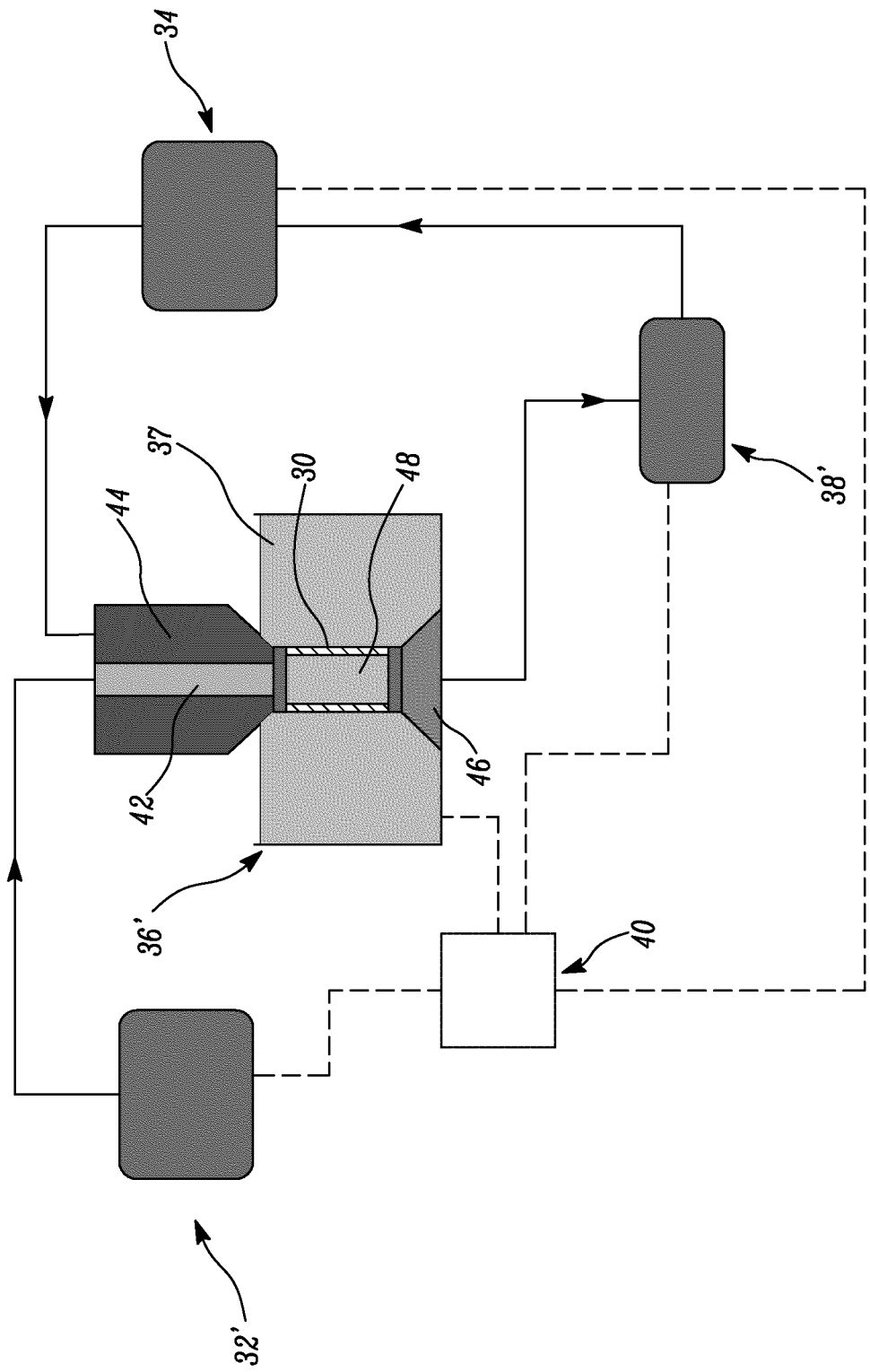
FIG. 11 is a schematic of another example apparatus for finishing a surface of a component.

Each of the examples described above delivers a flow of slurry (i.e., abrasive particles suspended in a liquid) to the surface of the components in order to provide the abrasive particles used in the surface finishing. However, alternative arrangements could deliver a flow of dry abrasives (i.e., abrasive particles not suspended in a fluid). In this case the liquid part of the working fluid, which is required for achieving conditions in which cavitation can take place, can be provided via the flow of pressurized liquid and, if present, the liquid in tank 37. Where ultrasonic or laser cavitation is used, as in FIG. 10, the use of dry abrasives requires an additional source of liquid not present in FIG. 10. FIG. 11 illustrates an example in which the component is immersed in a liquid, for example pure water, in a tank 37 such that the source of abrasives 34 can be either a source of slurry or a source of dry abrasives. Where dry abrasives are used, it will be understood that the filtration system 38 is suitably configured to filter the abrasives particles from the mixture received via the discharge line 46 and to return the dry abrasives for delivery to the cavitation chamber 36, 36'.

We claim:

1. An apparatus for finishing a surface of a component, the apparatus comprising:
   a cavitation generator configured to generate cavitation bubbles in a flow of liquid contacting the surface of the component;
   an abrasive supply line configured to deliver a flow of abrasives to the surface; and
   a controller configured to control the cavitation generator to generate the cavitation bubbles to finish the surface by implosion of the cavitation bubbles and configured to control the flow of the abrasives to finish the surface by abrasion, wherein
   the apparatus further comprises:
   a cavitation chamber in which the component is installed, the cavitation chamber including a nozzle comprising a first passageway located at a central region of the nozzle, and a second passageway configured to receive and deliver the flow of the abrasives to the surface, wherein the second passageway surrounds the first passageway, and wherein the cavitation chamber further includes a discharge line exiting from the cavitation chamber, wherein the discharge line carries at least the flow of the abrasives; and
   a filtration system configured to receive at least the flow of the abrasives from the discharge line and recirculate at least the abrasives to the abrasive supply line, and
   the first passageway extends to a first outlet and the second passageway extends to a second outlet, the first and the second outlet being arranged at a common discharge end of the nozzle, and
   the first and second passageways are separated from each other until they exit their respective outlets by a wall between the flow of liquid and the flow of abrasives.

2. The apparatus of claim 1, wherein the flow of the abrasives is either a flow of slurry comprising a suspended mixture of abrasive particles or a flow of dry abrasives.

3. The apparatus of claim 1, wherein the cavitation generator comprises an ultrasonic generator configured to generate the cavitation bubbles in the liquid contacting the surface by ultrasonic excitation in the liquid or a laser configured to generate the cavitation bubbles in the liquid contacting the surface by laser excitation in the liquid.

4. The apparatus of claim 1, wherein the cavitation generator comprises a liquid supply line configured to deliver the flow of the liquid to the surface to generate cavitation bubbles, and wherein the liquid supply line comprises a supply of the liquid, a liquid pump and a liquid pressure regulator, wherein the liquid pump and the liquid pressure regulator are configured to pressurise the flow of liquid, and the abrasive supply line comprises a supply of abrasives, an abrasives pump and an abrasives pressure regulator, wherein the abrasives pump and the abrasives pressure regulator are configured to pressurise the flow of abrasives.

5. The apparatus of claim 1, wherein the controller is configured to control pressure and/or flow rate of the flow of the liquid to control an intensity of cavitation bubble generation and/or cavitation bubble implosion.

6. The apparatus of claim 1, wherein the discharge line carries a mixed flow of the liquid and the abrasives and the filtration system is configured to receive the mixed flow and separate the mixed flow into the liquid and the abrasives, and wherein the filtration system is further configured to recirculate either only the separated abrasives or both the separated abrasives and separated liquid for delivery respectively to the liquid and abrasive supply lines.

7. The apparatus of claim 1, wherein the first passageway of the nozzle is configured to deliver the flow of the liquid to the surface.

8. The apparatus of claim 1, wherein the discharge line comprises a discharge pressure regulator configured to regulate a back pressure in the cavitation chamber.

9. The apparatus of claim 8, wherein the controller is configured to control the discharge pressure regulator to regulate the back pressure in the cavitation chamber.

10. The apparatus of claim 6, wherein the filtration system comprises a filtration tank having at least one filter, the filtration tank being configured to receive the mixed flow of liquid and abrasives, wherein, in use, the filter at least partially restricts the flow of abrasives within the filtration tank to separate the mixed flow into the liquid and the abrasives.

11. The apparatus of claim 10, wherein the filtration system comprises a plurality of filters, each of the plurality of filters having different pore sizes.

12. The apparatus of claim 1, wherein the surface comprises a surface of an internal channel of the component.

13. A method for finishing a surface of a component, the method comprising the steps of:
    installing the component in an apparatus configured to deliver a flow of abrasives to the surface and to generate cavitation bubbles in a flow of liquid contacting the surface using a cavitation generator, the apparatus comprising a filtration system and a nozzle having a first passageway located at a central region of the nozzle, and a second passageway configured to receive and deliver the flow of the abrasives to the surface, the second passageway surrounding the first passageway;
    controlling the cavitation generator such that the cavitation bubbles are generated to finish the surface by implosion of the cavitation bubbles;
    controlling the flow of the abrasives to the surface so as to finish the surface by abrasion; and
    controlling the flow of the abrasives through the filtration system, wherein the filtration system is configured to recirculate at least the abrasives for delivery to the apparatus, wherein
    the first passageway extends to a first outlet and the second passageway extends to a second outlet, the first and the second outlet being arranged at a common discharge end of the nozzle, and
    the first and second passageways are separated from each other until they exit their respective outlets by a wall between the flow of liquid and the flow of abrasives.

14. The apparatus of claim 1, wherein the nozzle includes an inlet end and an outlet end opposite of the inlet end, the first and second passageways extending from the inlet end of the nozzle to the outlet end of the nozzle.

15. The method of claim 13, the method further comprising mixing the flow of the liquid and the flow of the abrasives at the surface to generate a mixed flow and controlling the mixed flow through the filtration system, wherein the filtration system is configured to separate the mixed flow into the liquid and the abrasives and recirculate either only the separated abrasives or both the separated liquid and the separated abrasives for delivery to the apparatus.

16. The method of claim 13, wherein the flow of abrasives is either a flow of slurry comprising a suspended mixture of abrasive particles or a flow of dry abrasives.

17. The method of claim 13, wherein the cavitation generator is configured to deliver the flow of liquid to the surface to generate the cavitation bubbles.

18. The method of claim 13, wherein the cavitation generator comprises an ultrasonic generator configured to generate the cavitation bubbles in the liquid contacting the surface by ultrasonic excitation in the liquid or a laser configured to generate the cavitation bubbles in the liquid contacting the surface by laser excitation in the liquid.

19. The method of claim 18, comprising controlling an amplitude and/or a frequency of ultrasonic vibrations to control the generation of the cavitation bubbles.

20. The method of claim 18, comprising controlling a frequency, wavelength and/or an exposure time of the laser to control the generation of the cavitation bubbles.

21. The apparatus of claim 3, wherein the controller is configured to control an amplitude and/or a frequency of ultrasonic vibrations or a wavelength and/or an exposure time of the laser to control the generation of the cavitation bubbles.

* * * * *